United States Patent
Lien

(10) Patent No.: US 7,391,538 B2
(45) Date of Patent: Jun. 24, 2008

(54) SHEET-FED SCANNER CAPABLE OF SCANNING MULTIPLE SCAN LINES FOR IMAGE SIGNAL CALIBRATION

(75) Inventor: Szu Hui Lien, Hsinchu (TW)

(73) Assignee: Avision Inc.

( * ) Notice: Subject to any disclaimer, the term of this patent is extended or adjusted under 35 U.S.C. 154(b) by 576 days.

(21) Appl. No.: 11/048,706

(22) Filed: Feb. 3, 2005

(65) Prior Publication Data
US 2005/0179959 A1 Aug. 18, 2005

(30) Foreign Application Priority Data
Feb. 13, 2004 (TW) .............................. 93103578 A

(51) Int. Cl.
*H04N 1/04* (2006.01)
*H04N 1/40* (2006.01)
(52) U.S. Cl. .................. 358/461; 358/474; 358/496
(58) Field of Classification Search ................ 358/461, 358/406, 504, 496, 498, 486, 488, 474, 505; 382/274; 399/367, 364, 370, 371, 374; 355/23; 55/23
See application file for complete search history.

(56) References Cited

U.S. PATENT DOCUMENTS 6,323,933 B1 * 11/2001 Anzai .......................... 355/23
7,126,725 B2 * 10/2006 Okutomi et al. ............. 358/474

FOREIGN PATENT DOCUMENTS

JP 01277054 A * 11/1989

* cited by examiner

*Primary Examiner*—Cheukfan Lee

(57) ABSTRACT

In a sheet-fed scanner capable of scanning multiple scan lines as a calibration standard for an image signal, a scanning module scans a document, which is fed across a scan region by a sheet-feeding mechanism, and a stationary calibration sheet in the scan region. The scanning module includes an image sensor, a lens and at least one reflecting mirror. An actuator actuates the reflecting mirror to enable the image sensor to sense a plurality of scan lines on the calibration sheet through the lens and the reflecting mirror in order to obtain a calibration standard for the image signal of the document. The calibration standard is adopted to calibrate an image signal of the document, and with this invention, it is possible to avert any flaws in image quality caused by the contaminated calibration sheet.

13 Claims, 6 Drawing Sheets

SHEET-FED SCANNER CAPABLE OF SCANNING MULTIPLE SCAN LINES FOR IMAGE SIGNAL CALIBRATION

BACKGROUND OF THE INVENTION

1. Field of the Invention

The invention relates to a sheet-fed scanner capable of scanning multiple scan lines for image signal calibration, and more particularly to a sheet-fed scanner capable of scanning multiple scan lines on a calibration sheet for image signal calibration.

2. Description of the Related Art

Typically, before scanning a document, a scanner has to scan a calibration sheet with a standard color, such as the standard white, the standard black or the like, to obtain a calibration standard for calibrating an image signal of the document.

In the conventional sheet-fed scanner, the stationary scanning module scans the document fed by the sheet-feeding mechanism as well as the stationary calibration sheet. Therefore, when the scanning module is scanning the calibration sheet, the data of only one scan line can be obtained as the calibration standard for the subsequent scanning process. If the calibration sheet is contaminated, the data of the single scan line may be flawed, which would greatly influence the subsequent scanning result.

Thus, providing a sheet-fed scanner capable of scanning multiple scan lines as the calibration standard for the image signal of the document without distorting the calibrated image is an important object to be achieved by the invention.

SUMMARY OF THE INVENTION

It is therefore an object of the invention to provide a sheet-fed scanner capable of scanning multiple scan lines for image signal calibration, wherein at least one reflecting mirror of a scanning module is slightly rotated such that the multiple scan lines on a calibration sheet are scanned as the calibration standard for the image signal of a document.

To achieve the above-identified object, the invention provides a sheet-fed scanner capable of scanning multiple scan lines for image signal calibration. The scanner includes a housing, a sheet-feeding mechanism, a first scanning module, a first actuator and a first calibration sheet. The sheet-feeding mechanism feeds a document across a scan region. The first scanning module is fixed in the housing and scans a front side of the document. The first scanning module includes a first image sensor, a first lens and at least one first reflecting mirror. The first actuator actuates the at least one first reflecting mirror. The first calibration sheet is fixed in the housing and located in the scan region. The first actuator actuates the at least one first reflecting mirror such that the first image sensor senses a plurality of scan lines of the first calibration sheet through the first lens and the at least one first reflecting mirror, as a calibration standard for a first image signal obtained when the first image sensor senses the front side of the document.

In the above-mentioned sheet-fed scanner, it is possible to utilize the property of a cam, a piezoelectric material or a bimetal material to rotate the reflecting mirror such that the scanner can scan multiple scan lines of the calibration sheet for obtaining the calibration standard for the image signal of the document.

DETAILED DESCRIPTION OF THE INVENTION

The embodiments of the invention will be described with reference to the accompanying drawings.

Figure 1:
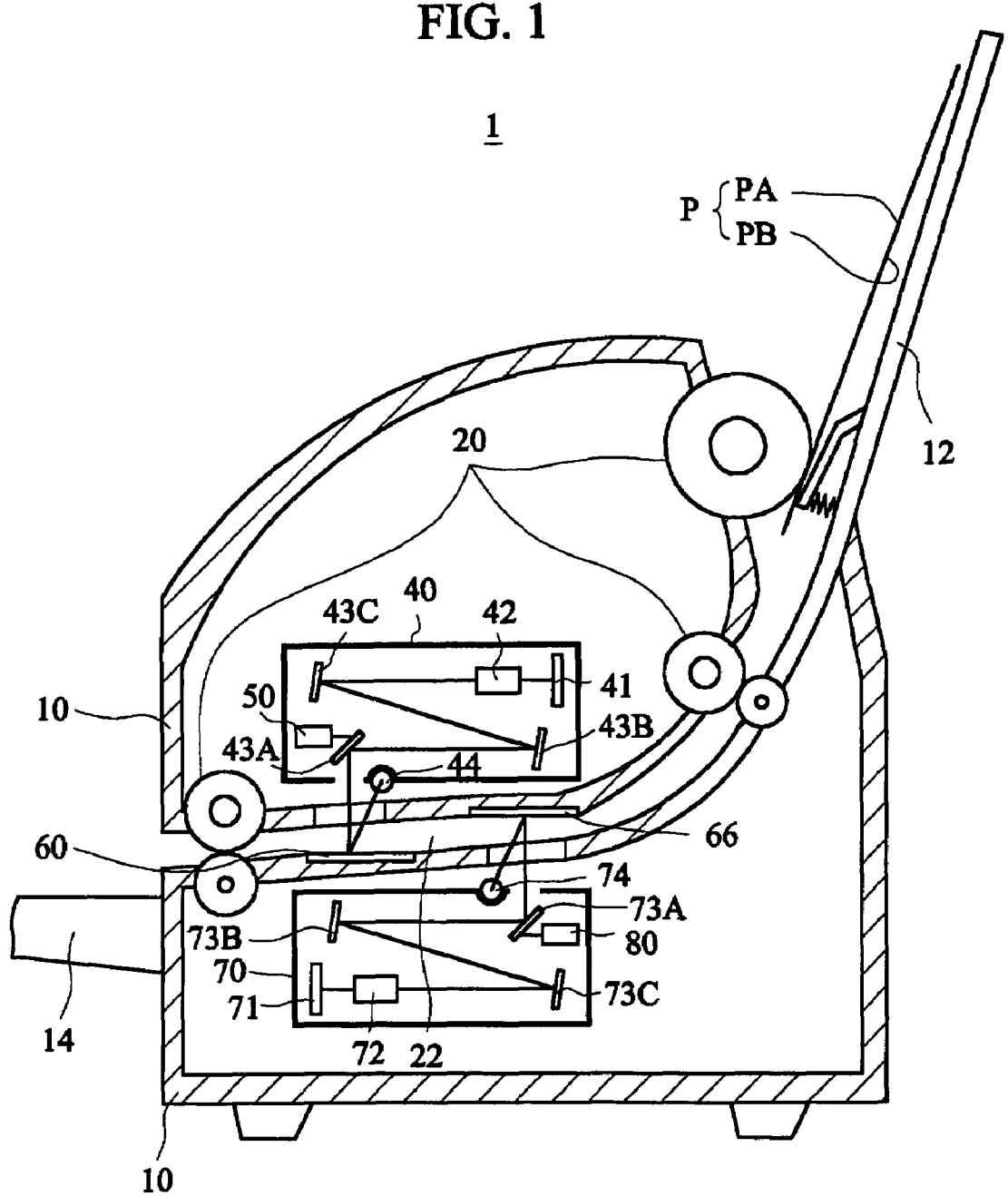
FIG. 1 shows a sheet-fed scanner according to a first embodiment of the invention.
Figure 2:
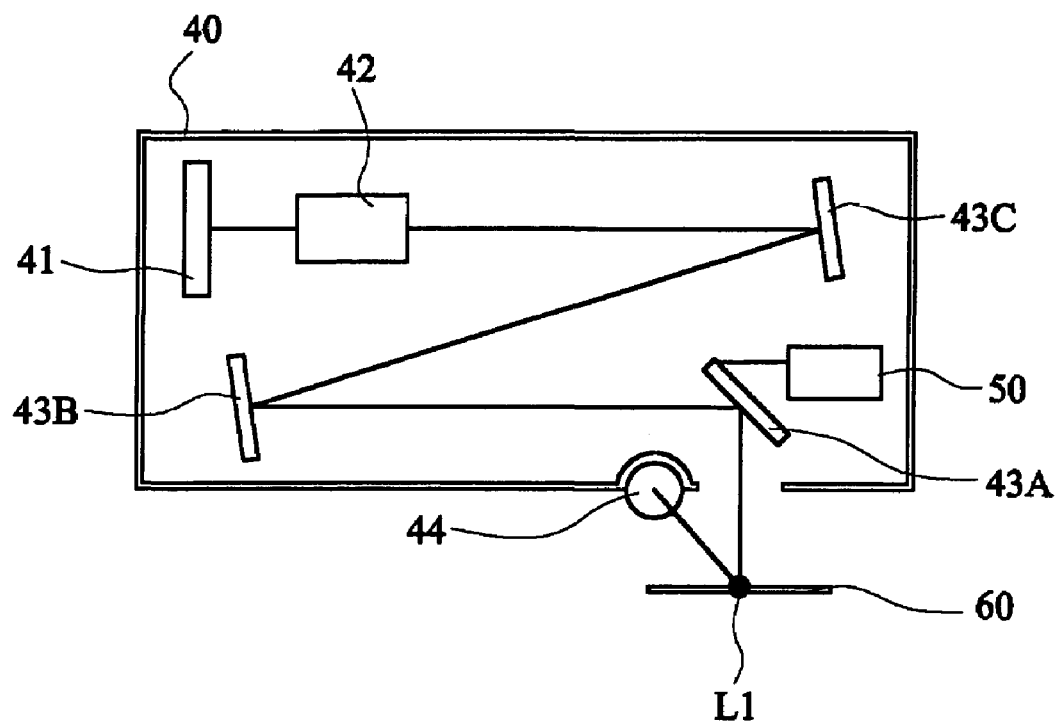
FIG. 2 shows a first state of the scanning module of FIG. 1.
Figure 3:
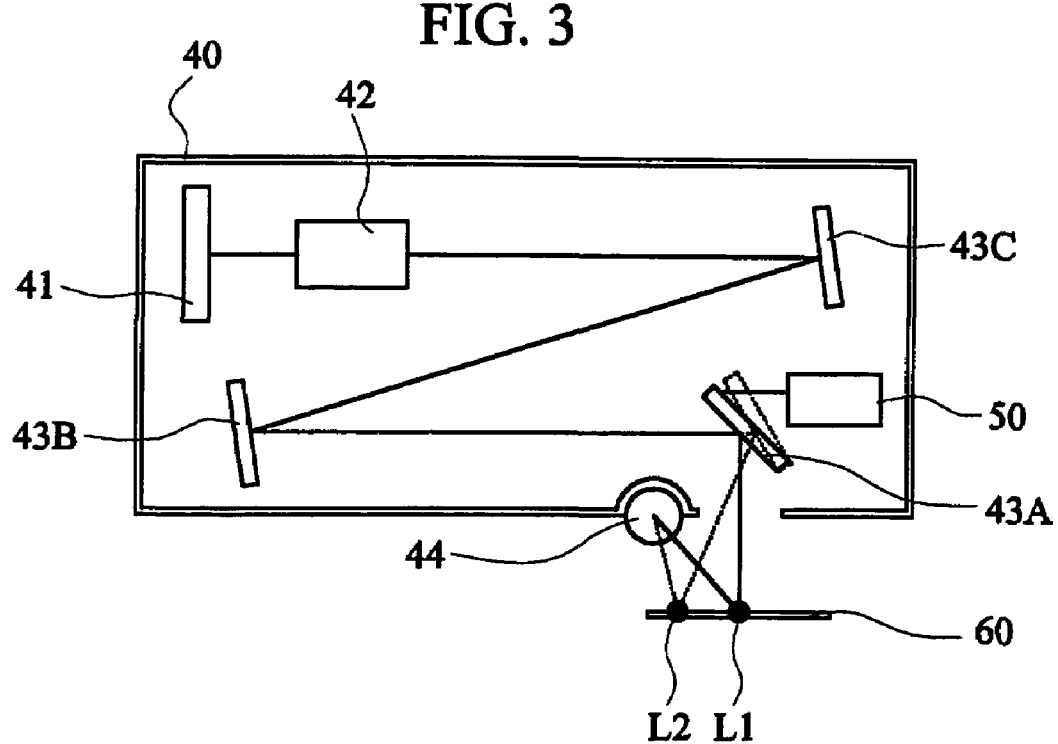
FIG. 3 shows a second state of the scanning module of FIG. 1.

FIG. 1 shows a sheet-fed scanner according to a first embodiment of the invention. FIGS. 2 and 3 respectively show a first state and a second state of the scanning module of FIG. 1. As shown in FIGS. 1 to 3, a sheet-fed scanner 1 of the invention capable of scanning multiple scan lines for image signal calibration is a duplex sheet-fed scanner for scanning a front side and a back side of a document. In fact, the concept of the invention may also be implemented in a simplex sheet-fed scanner.

The sheet-fed scanner 1 includes a housing 10, a sheet-feeding mechanism 20, a first scanning module 40, a first actuator 50 and a first calibration sheet 60. The housing 10 has a sheet input tray 12 for supporting a to-be-scanned document P, and a sheet output tray 14 for supporting the document P that is scanned. The sheet-feeding mechanism 20 feeds the document P across a scan region 22. The first scanning module 40 is fixed in the housing 10 and scans a front side PA of the document P. The first scanning module 40 includes a first image sensor 41, a first lens 42, a plurality of first reflecting mirrors 43A to 43C, and a first light source 44 for illuminating the front side PA of the document P and the first calibration sheet 60. The first actuator 50 actuates the first reflecting mirror 43A. The first calibration sheet 60 is fixed in the housing 10 and positioned in the scan region 22. A light ray coming from the first calibration sheet 60 is reflected subsequently by the first reflecting mirrors 43A, 43B and 43C to the first lens 42 which focuses the light ray onto the first image sensor 41. As the first actuator 50 actuates the first reflecting mirror 43A, the first image sensor 41 senses a plurality of scan lines L1 and L2 of the first calibration sheet 60 through the first lens 42 and the first reflecting mirrors 43A to 43C, for obtaining a calibration standard for a first image signal acquired when the first image sensor senses the front side PA of the document P. In practice, the number of scan lines may be three or more than three, and the scanning data of all the scan lines may be averaged to generate the calibration standard for the image signal. Alternatively, the scanning data of some scan lines, which is greatly different from the average value, may be omitted in order to get a more accurate calibration standard for the image signal of the document.

In addition, the duplex sheet-fed scanner 1 further includes a second scanning module 70, a second actuator 80 and a second calibration sheet 66, which are constructed similarly to the first scanning module 40, the first actuator 50 and the first calibration sheet 60. The second scanning module 70, which is fixed in the housing 10 and opposite to the first scanning module 40, scans a back side PB of the document P. Similar to the first scanning module 40, the second scanning module 70 includes a second image sensor 71, a second lens 72, a plurality of second reflecting mirrors 73A to 73C, and a second light source 74. The second actuator 80 actuates the second reflecting mirror 73A. The second calibration sheet 66 is fixed in the housing 10 and positioned in the scan region 22. As the second actuator 80 actuates the second reflecting mirror 73A, the second image sensor 71 senses a plurality of scan lines of the second calibration sheet 66 through the second lens 72 and the second reflecting mirrors 73A to 73C in order to obtain a calibration standard for a second image signal acquired when the second image sensor 71 senses the back side PB of the document P. Each of the image sensors 41 and 71 may be a charge coupled device (CCD).

In the drawings, the illustrated first calibration sheet 60 has a level surface. In other embodiments, however, the first calibration sheet 60 may also have a curved surface, which is capable of reducing the difference between the optical paths corresponding to the scan lines L1 and L2 in FIG. 3 so as to obtain a better calibration effect.

In the above-mentioned embodiment, the effect of the invention may be achieved as long as at least one of the reflecting mirrors is rotated, and the arrangement and number of the reflecting mirrors are not limited to those as shown in the drawings. Because the rotation of the reflecting mirror is very sensitive to the variation of the optical path, a small angle rotation of the reflecting mirror may achieve the effect of the invention. The rotatable reflecting mirror is preferably close to the calibration sheet such that the allowable rotation angle of the reflecting mirror may be enlarged to facilitate the implementation. The example of the actuator will be described in the following example.

Figure 4:
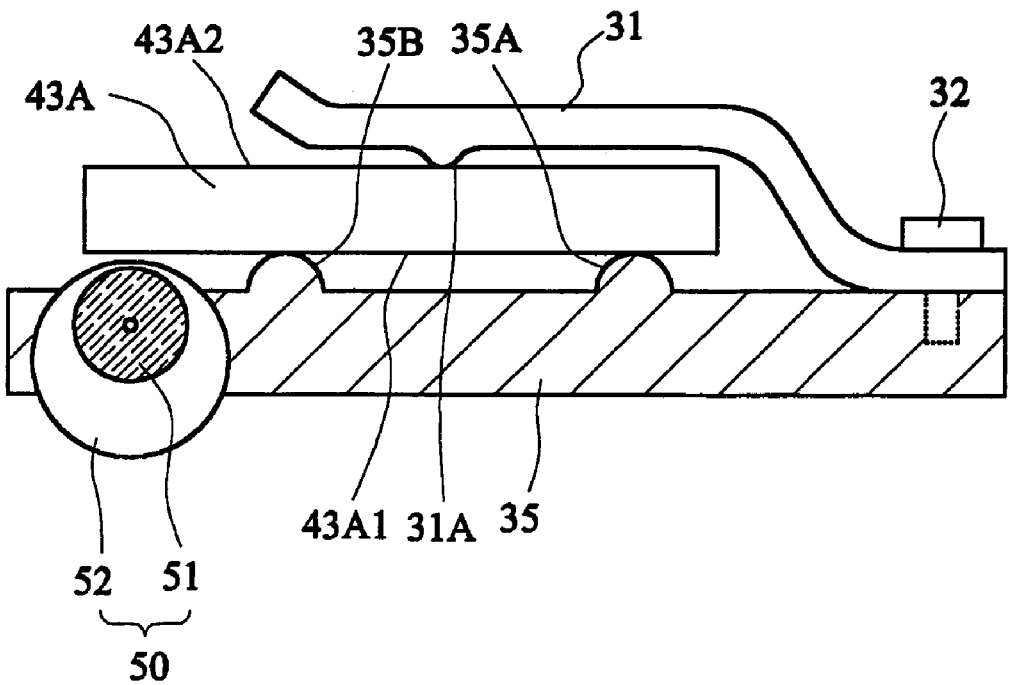
FIG. 4 is a side view showing a first state of a first actuating mechanism corresponding to the reflecting mirror of FIG. 2.
Figure 5:
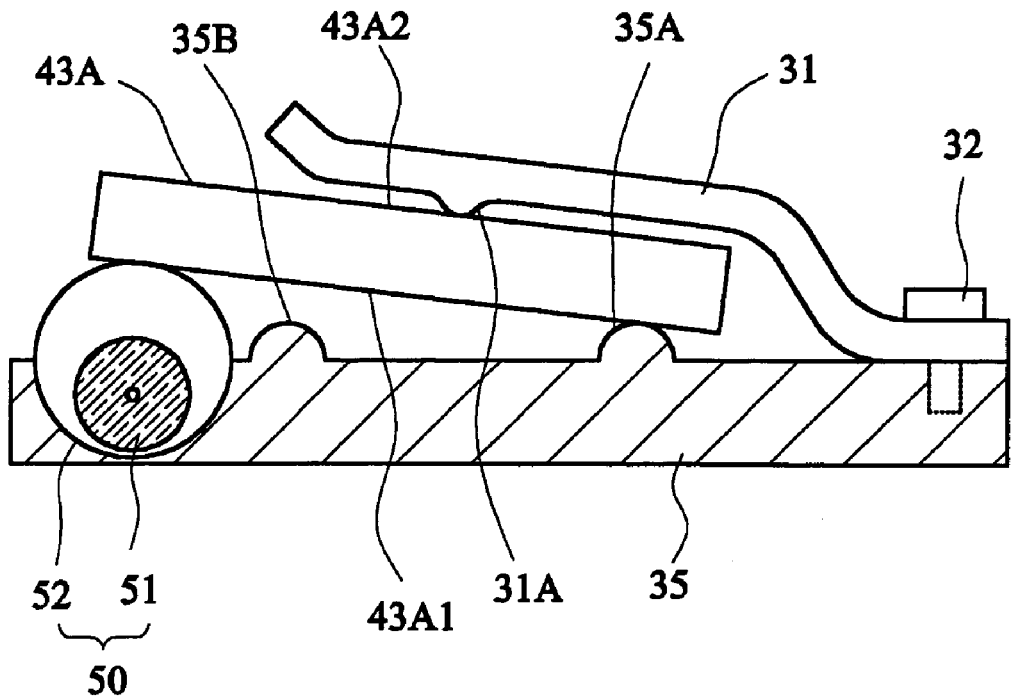
FIG. 5 is a side view showing a second state of the first actuating mechanism corresponding to the reflecting mirror of FIG. 3.
Figure 6:
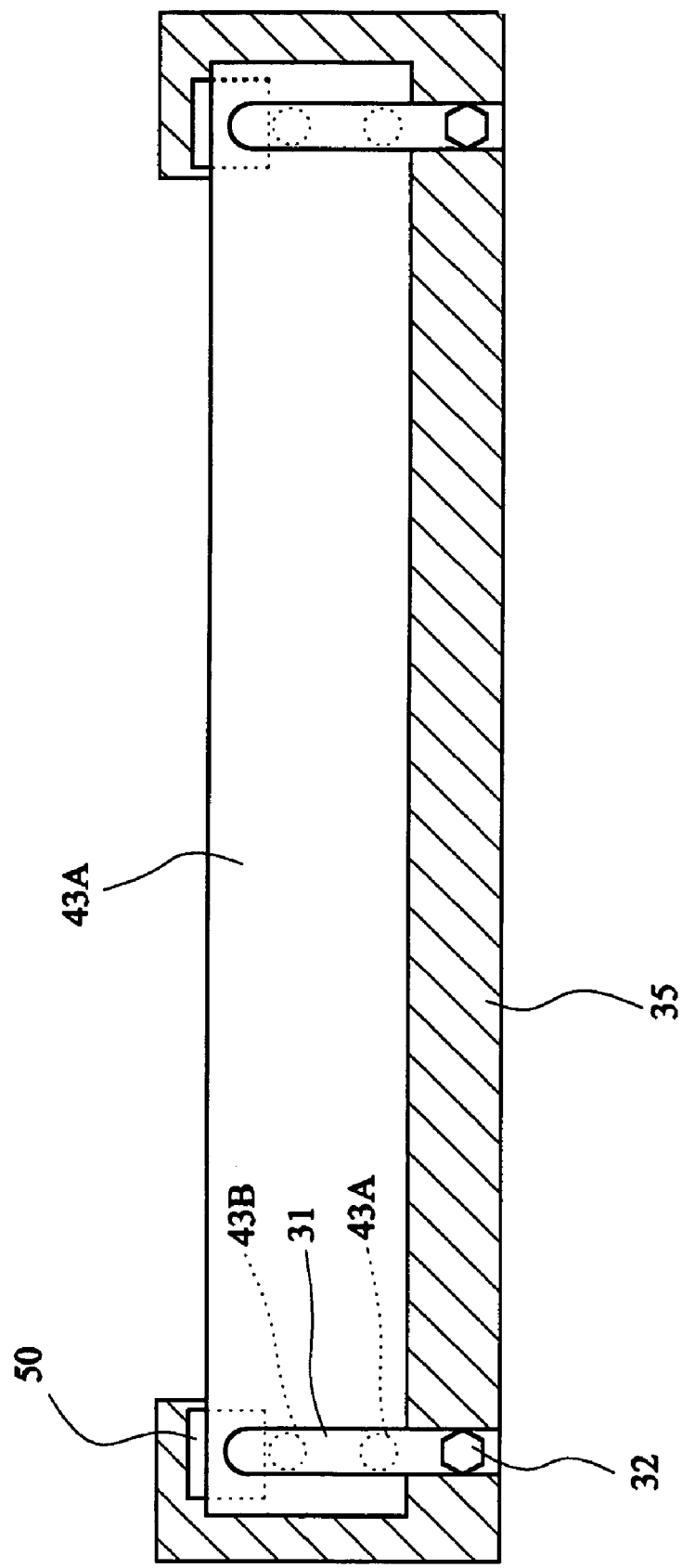
FIG. 6 is a top view showing the first actuating mechanism corresponding to the reflecting mirror of FIG. 4.

FIGS. 4 and 5 are side views respectively showing a first state and a second state of a first actuating mechanism corresponding to the reflecting mirror of FIG. 2, and FIG. 6 is a top view showing the first actuating mechanism corresponding to the reflecting mirror of FIG. 4. As shown in FIGS. 4 to 6, the first actuator 50 includes, for example, a motor 51 and a cam 52, wherein the motor 51 drives the cam 52 to rotate the first reflecting mirror 43A. The first reflecting mirror 43A is placed on a base 35, which may pertain to the housing 10 of the scanner or the housing of the first scanning module 40. The base 35 has two projections 35A and 35B in contact with a lower surface 43A1 of the first reflecting mirror 43A. An elastic member 31 pushes an upper surface 43A2 of the first reflecting mirror 43A toward the base 35. The elastic member 31 is an elastic arm having one end fixed to the base 35 by a bolt 32. The elastic arm has a projection 31A corresponding to a position between the two projections 35A and 35B of the base 35 so as to fix the first reflecting mirror 43A in contact with the projections 35A and 35B. To rotate the first reflecting mirror 43A, the first actuator 50 pushes a side of the first reflecting mirror 43A upwards such that the first reflecting mirror 43A parts from the projection 35B.

It is to be noted that the first actuator 50 is not in contact with the first reflecting mirror 43A before the first actuator 50 rotates the first reflecting mirror 43A, in order to enhance the positioning precision and stability of the first reflecting mirror 43A when the document is being scanned. Therefore, the reference position of the first reflecting mirror 43A, when the first scanning module 40 is scanning the document, depends on the positions of the two projections 35A and 35B of the base 35 and is free from being influenced by the cam 52. Hence, the reference position of the first reflecting mirror 43A may be adjusted to a best position when the scanning module is assembled.

Figure 7:
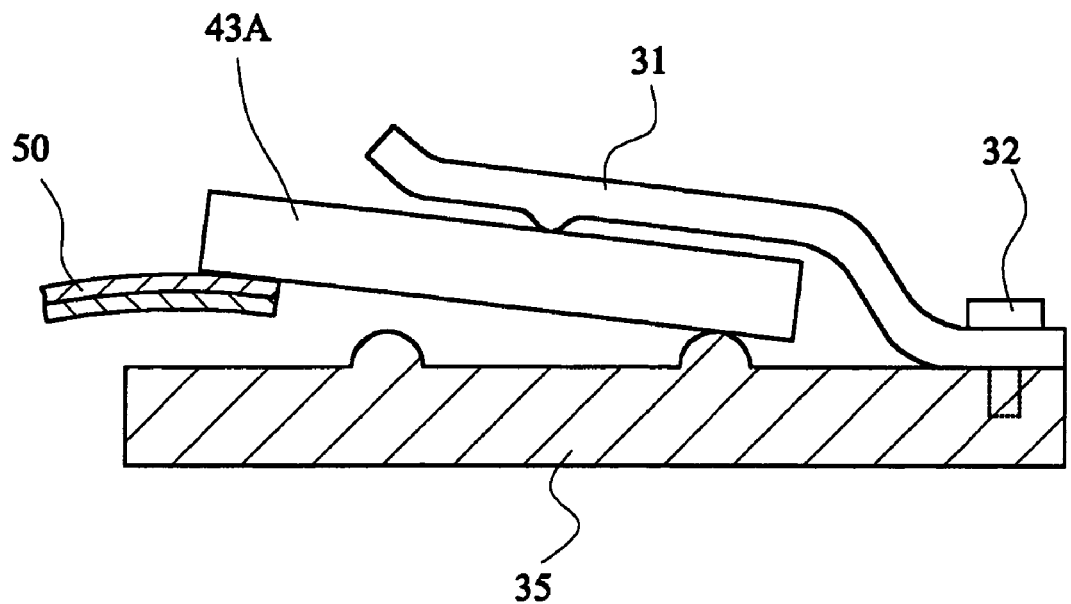
FIG. 7 shows a second actuating mechanism for the reflecting mirror.

FIG. 7 shows a second actuating mechanism for the reflecting mirror. As shown in FIG. 7, the first actuator 50 is made of a piezoelectric material. When a voltage is applied to the piezoelectric material, the piezoelectric material deforms to rotate the first reflecting mirror 43A.

Figure 8:
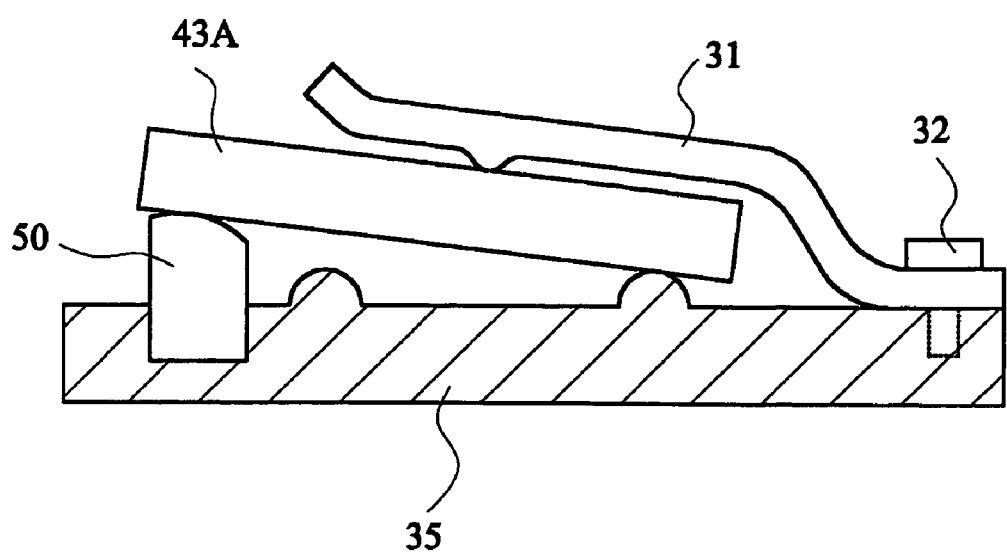
FIG. 8 shows a third actuating mechanism for the reflecting mirror.

FIG. 8 shows a third actuating mechanism for the reflecting mirror. As shown in FIG. 8, the first actuator 50 is made of a bimetal material. When a voltage is applied to the bimetal material, the bimetal material deforms to rotate the first reflecting mirror 43A.

Figure 9:
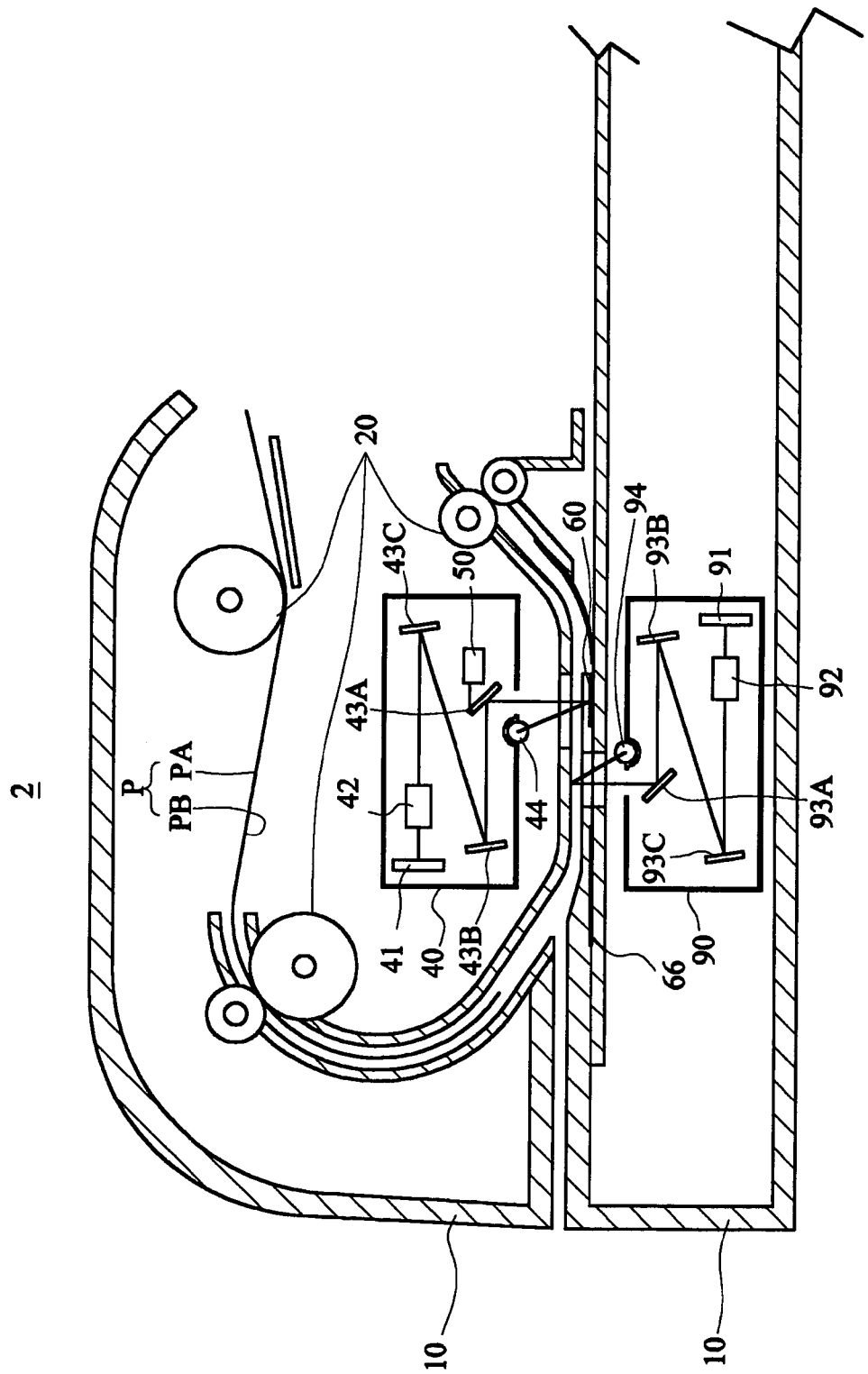
FIG. 9 shows a sheet-fed scanner according to a second embodiment of the invention.

FIG. 9 shows a sheet-fed scanner according to a second embodiment of the invention. As shown in FIG. 9, a sheet-fed scanner 2 of this embodiment is similar to the sheet-fed scanner 1 of the first embodiment except that the second scanning module 90 of this embodiment is movably mounted in the housing 10 and opposite to the first scanning module 40 so as to provide the functions of flatbed scanning and sheet-fed scanning. Because the second scanning module 90 is movable, multiple scan lines on the second calibration sheet 66 may be scanned without the reflecting mirror corresponding to the second scanning module being rotated. When the sheet-fed scanner is scanning, the second scanning module 90 scans the back side PB of the document P. Similarly, the second scanning module 90 includes a second image sensor 91, a second lens 92, a plurality of second reflecting mirrors 93A to 93C, and a second light source 94.

According to the embodiment of the invention, it is possible to implement the sheet-fed scanner capable of scanning multiple scan lines for obtaining the calibration standard for the image signal. Using the cam, the piezoelectric material, the bimetal material, and the like can achieve the small angle rotation of the reflecting mirror, and can thus effectively increase the number of scan lines when the scanning module is scanning the calibration sheet. Therefore, the distorted calibrated result, due to the contaminated calibration sheet, may be avoided.

While the invention has been described by way of examples and in terms of preferred embodiments, it is to be understood that the invention is not limited to the disclosed embodiments. To the contrary, it is intended to cover various modifications. Therefore, the scope of the appended claims should be accorded the broadest interpretation so as to encompass all such modifications.

What is claimed is:

1. A sheet-fed scanner capable of scanning multiple scan lines for image signal calibration, the sheet-fed scanner comprising:

a housing;

a sheet-feeding mechanism for feeding a document across a scan region;

a first scanning module, which is fixed in the housing, for scanning a front side of the document, wherein the first scanning module comprises a first image sensor, a first lens and at least one first reflecting mirror;

a first actuator for actuating the at least one first reflecting mirror; and a first calibration sheet fixed in the housing and located in the scan region, wherein the first actuator actuates the at least one first reflecting mirror such that the first image sensor senses a plurality of scan lines of the first calibration sheet through the first lens and the at least one first reflecting mirror, as a calibration standard for first image signal obtained when the first image sensor senses the front side of the document, wherein the at least one first reflecting mirror is placed on a base having two projections in contact with a lower surface of the at least one first reflecting mirror and an elastic member presses against an upper surface of the at least one first reflecting mirror, such that when the first actuator pushes a side of the at least one first reflecting mirror upwards, the at least one first reflecting mirror parts from one of the projections and the at least one first reflecting mirror is rotated.

2. The sheet-fed scanner according to claim 1, wherein the first calibration sheet has a level surface.

3. The sheet-fed scanner according to claim 1, wherein the first calibration sheet has a curved surface.

4. The sheet-fed scanner according to claim 1, wherein the first actuator comprises:

a power source; and a cam driven by the power source to rotate the at least one first reflecting mirror.

5. The sheet-fed scanner according to claim 4, wherein the power source is a motor.

6. The sheet-fed scanner according to claim 1, wherein the first actuator is made of a piezoelectric material, and the piezoelectric material deforms to rotate the at least one first reflecting mirror when a voltage is applied to the piezoelectric material.

7. The sheet-fed scanner according to claim 1, wherein the first actuator is made of a bimetal material, and the bimetal material deforms to rotate the at least one first reflecting mirror when a voltage is applied to the bimetal material.

8. The sheet-fed scanner according to claim 1, wherein the first scanning module further comprises a first light source for illuminating the front side of the document and the first calibration sheet.

9. The sheet-fed scanner according to claim 1, wherein the elastic member is an elastic arm having one end fixed to the base and one projection corresponding to a position between the two projections of the base.

10. The sheet-fed scanner according to claim 1, wherein the first actuator is not in contact with the at least one first reflecting mirror before the first actuator rotates the at least one first reflecting mirror.

11. The sheet-fed scanner according to claim 1, further comprising:

a second scanning module, which is fixed in the housing and opposite to the first scanning module, for scanning a back side of the document, wherein the second scanning module comprises a second image sensor, a second lens, at least one second reflecting mirror and a second light source;

a second actuator for driving the at least one second reflecting mirror; and a second calibration sheet fixed in the housing and located in the scan region, wherein the second actuator actuates the at least one second reflecting mirror such that the second image sensor senses a plurality of scan lines of the second calibration sheet, through the second lens and the at least one second reflecting mirror, as a calibration standard for a second image signal obtained when the second image sensor senses the back side of the document.

12. The sheet-ted scanner according to claim 1, further comprising:

a second scanning module, which is movably mounted in the housing and opposite to the first scanning module, for scanning a back side of the document.

13. The sheet-fed scanner according to claim 12, wherein the second scanning module comprises a second image sensor, a second lens, at least one second reflecting mirror and a second light source.

* * * * *